United States Patent
Bill

(10) Patent No.: US 9,895,943 B2
(45) Date of Patent: Feb. 20, 2018

(54) METHOD OF CHECKING THE PRESSURE OF AN AIRCRAFT TIRE

(71) Applicant: Airbus Operations Limited, Bristol (GB)

(72) Inventor: Andrew Bill, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 15/075,411

(22) Filed: Mar. 21, 2016

(65) Prior Publication Data

US 2016/0272020 A1    Sep. 22, 2016

(30) Foreign Application Priority Data

Mar. 20, 2015 (GB) .................... 1504776.4

(51) Int. Cl.
  *B60C 23/04* (2006.01)
  *B64C 25/36* (2006.01)
(52) U.S. Cl.
  CPC .......... *B60C 23/0476* (2013.01); *B60C 23/04* (2013.01); *B60C 23/0422* (2013.01); *B60C 23/0479* (2013.01); *B64C 25/36* (2013.01); *B60C 2200/02* (2013.01)
(58) Field of Classification Search
  CPC . B60C 23/0476; B60C 23/04; B60C 23/0422; B60C 23/0479; B64C 25/36
  USPC ............................................. 340/10.52, 447
  See application file for complete search history.

(56) References Cited

U.S. PATENT DOCUMENTS

| 4,283,707 | A | 8/1981 | Church |
| 4,355,298 | A | 10/1982 | Jessup |
| 5,963,128 | A | 10/1999 | McClelland |
| 7,620,484 | B1 * | 11/2009 | Chen .................... G06Q 20/102 701/31.5 |
| 8,618,925 | B2 | 12/2013 | Petrucelli et al. |
| 2002/0092345 | A1 | 7/2002 | Van Niekerk et al. |
| 2002/0130771 | A1 | 9/2002 | Osborne et al. |
| 2004/0138793 | A1 * | 7/2004 | Taguchi .............. B60C 23/0415 701/29.3 |

(Continued)

FOREIGN PATENT DOCUMENTS

| EP | 2 732 988 | 5/2014 |
| JP | 2007-022381 | 2/2007 |
| WO | 20131152294 | 10/2013 |

OTHER PUBLICATIONS

Crane Aerospace & Electronics, Smart Stem, Wireless Tire Pressure Management System, www.craneae.com/smartstem (May 2014).

(Continued)

*Primary Examiner* — Omar Casillashernandez
(74) *Attorney, Agent, or Firm* — Nixon & Vanderhye P.C.

(57) ABSTRACT

A method of checking the pressure of a tire of an aircraft. A pressure reading is taken from the tire with a pressure sensor and wirelessly transmitted to a hand-held device. The hand-held device receives the pressure reading, an aircraft ID which uniquely identifies the aircraft, and a tire ID. The device then retrieves from a memory a reference pressure level associated in the memory with the aircraft ID and the tire ID; compares either the pressure reading, or an adjusted pressure based on the pressure reading, with the reference pressure level; and displays a warning if the pressure reading, or the adjusted pressure based on the pressure reading, is below the reference pressure level.

20 Claims, 4 Drawing Sheets

(56) References Cited

U.S. PATENT DOCUMENTS

| | | | |
|---|---|---|---|
| 2005/0071057 A1* | 3/2005 | Lin | B60C 23/0413 701/29.6 |
| 2008/0024287 A1* | 1/2008 | Boyle | B60C 23/0408 340/442 |
| 2008/0055060 A1 | 3/2008 | Logan | |
| 2008/0147262 A1* | 6/2008 | Daniels | G06Q 30/00 701/31.4 |
| 2011/0106464 A1* | 5/2011 | Petrucelli | B60C 23/006 702/50 |
| 2013/0145834 A1* | 6/2013 | Mouchet | B60C 23/00 73/146.4 |
| 2014/0011455 A1* | 1/2014 | Hsu | B60C 23/0447 455/41.3 |
| 2015/0029016 A1* | 1/2015 | Lesesky | B60C 23/045 340/442 |
| 2015/0239308 A1* | 8/2015 | Yu | B60C 23/0471 340/10.52 |
| 2015/0284108 A1* | 10/2015 | Keller | B64D 43/00 340/960 |
| 2016/0046158 A1* | 2/2016 | Keller | B60C 23/0498 73/146.5 |
| 2016/0121669 A1* | 5/2016 | Xu | B60C 23/20 340/449 |

OTHER PUBLICATIONS

747 Wireless Tire Pressure Sensing System, Crane Aerospace & Electronics 2010—rev. May 2010—SmartStem 747 (May 2010).

A320 Wireless Tire Pressure Sensing System, Crane Aerospace & Electronics 2010—rev. May 2010—A320 SmartStem Overview (May 2010).

SmartStem Wireless Tire Pressure System Certified for Boeing 747-400 Aircraft, Crane Newsroom (Mar. 2015).

Extended European Search Report cited in European patent application No. 1616127T5, dated Jul. 21, 2016.

* cited by examiner

METHOD OF CHECKING THE PRESSURE OF AN AIRCRAFT TIRE

RELATED APPLICATION

The present application claims priority to GB Patent Application Number 1504776.4, filed Mar. 20, 2015, the disclosure of which is entirely incorporated by reference.

FIELD OF THE INVENTION

The present invention relates to a method of checking the pressure of a tire of an aircraft; apparatus for performing such a method; and a hand-held device for use in such a method.

BACKGROUND OF THE INVENTION

Modern aircraft landing gear have tire pressure sensors taking tire pressure measurements which are displayed in a cockpit of the aircraft. A problem with this arrangement is that ground crew checking the tire pressures of a fleet of aircraft must board each aircraft in order to view and check the pressure measurements.

An aircraft tire monitoring system is disclosed in US-A-2008/0055060. A sensor senses an operating parameter of the tire (such as pressure or temperature), and a signal related to the sensed parameter is transmitted to a reader located on or in an aircraft fuselage. The reader may also transmit some or all of the information to another device, such as a display.

SUMMARY OF THE INVENTION

A first aspect of the invention provides a method of checking the pressure of a tire of an aircraft, the method comprising: taking a pressure reading from the tire with a pressure sensor; transmitting the pressure reading to a hand-held device via a wireless connection; and at the hand-held device: receiving the pressure reading from the pressure sensor via the wireless connection; obtaining an aircraft identification (ID) which uniquely identifies the aircraft; obtaining a tire ID; obtaining a reference pressure level associated with the aircraft ID and the tire ID; comparing either the pressure reading, or an adjusted pressure based on the pressure reading, with the reference pressure level; and displaying a warning if the pressure reading, or the adjusted pressure based on the pressure reading, is below the reference pressure level.

The advantage of using a hand-held device to wirelessly obtain the pressure readings is that a single ground crew member can quickly check the tires of a large number of aircraft without having to enter their cockpits. The use of an aircraft ID and associated reference pressure level enables the ground crew member to quickly and reliably check the tire pressures of a fleet containing different aircraft types.

Optionally the pressure reading is compared with the reference pressure level, and a warning displayed if the pressure reading is below the reference pressure level. Alternatively an adjusted pressure is calculated based on the pressure reading and compared with the reference pressure level, and a warning displayed if the adjusted pressure is below the reference pressure level. In a further alternative, both the pressure reading and the adjusted pressure are compared with the reference pressure level, and associated warnings displayed if appropriate.

Optionally a tire gas temperature reading is obtained which is indicative of a gas temperature of the tire, and an ambient temperature value is also obtained which is indicative of an ambient temperature. The adjusted pressure can then be calculated based on the tire gas temperature reading and the ambient temperature value, the adjusted pressure estimating the pressure of the tire when the gas temperature of the tire reduces to the ambient temperature.

The aircraft ID may be obtained by receiving it from the pressure sensor via the wireless connection and/or by receiving it from a user interface such as a keyboard, touch screen or camera. Optionally the aircraft ID is received both from the pressure sensor via the wireless connection and from a user interface; and the method further comprises checking that that aircraft ID received from the pressure sensor matches the aircraft ID received from the user interface. This cross-check prevents ground crew from inadvertently associating a pressure reading with the wrong aircraft.

The aircraft ID and/or the tire ID may be obtained at the hand-held device before or after the pressure reading, or it may be obtained by receiving it from the pressure sensor along with the pressure reading via the wireless connection.

The reference pressure level may obtained by retrieving it from a memory of the hand-held device based on the aircraft ID and tire ID, or by receiving it from the pressure sensor via the wireless connection.

The method may be used to check one tire only, but more usually it is repeated for a second tire of the aircraft, and most typically it is repeated for all of the tires of the aircraft. In this case the multiple pressure readings can be displayed simultaneously at the hand-held device (i.e. in the same display screen) or one after the other.

The method may be used to check the tires of only a single aircraft, but more typically it is repeated for multiple aircraft, each having a different aircraft ID.

A further aspect of the invention provides a hand-held device for checking the pressure of a tire of an aircraft, the device comprising: a receiver for receiving a pressure reading from a tire pressure sensor via a wireless connection; a display; and a processor programmed to compare the pressure reading, or an adjusted pressure based on the pressure reading, with a reference pressure level, and cause the display to present a warning if the pressure reading, or the adjusted pressure based on the pressure reading, is below the reference pressure level. The device is suitable for performing the method of the first aspect.

Typically the reference pressure level is associated with an aircraft ID which uniquely identifies the aircraft and a tire ID; and the hand-held device is configured to obtain the aircraft ID, the tire ID, and the reference pressure level.

Optionally the device comprises a memory containing the reference pressure level, and the processor is programmed to obtain the reference pressure level by retrieving it from the memory. Alternatively the reference pressure level is obtained by the processor by receiving it from the tire pressure sensor via the wireless connection and the receiver.

Optionally the processor is programmed to obtain the aircraft ID and/or the tire ID from the tire pressure sensor via the receiver and the wireless connection. Alternatively the device comprises a user interface and the processor is programmed to obtain the aircraft ID and/or the tire ID from the user interface.

A further aspect of the invention provides an aircraft landing gear system comprising: a tire; a hand-held device according to the previous aspect of the invention; and a pressure sensor arranged to take a pressure reading from the tire and transmit the pressure reading to the hand-held device via the wireless connection.

Optionally the pressure sensor comprises a memory storing the aircraft ID, and the pressure sensor is arranged to transmit the aircraft ID to the hand-held device via the wireless connection.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
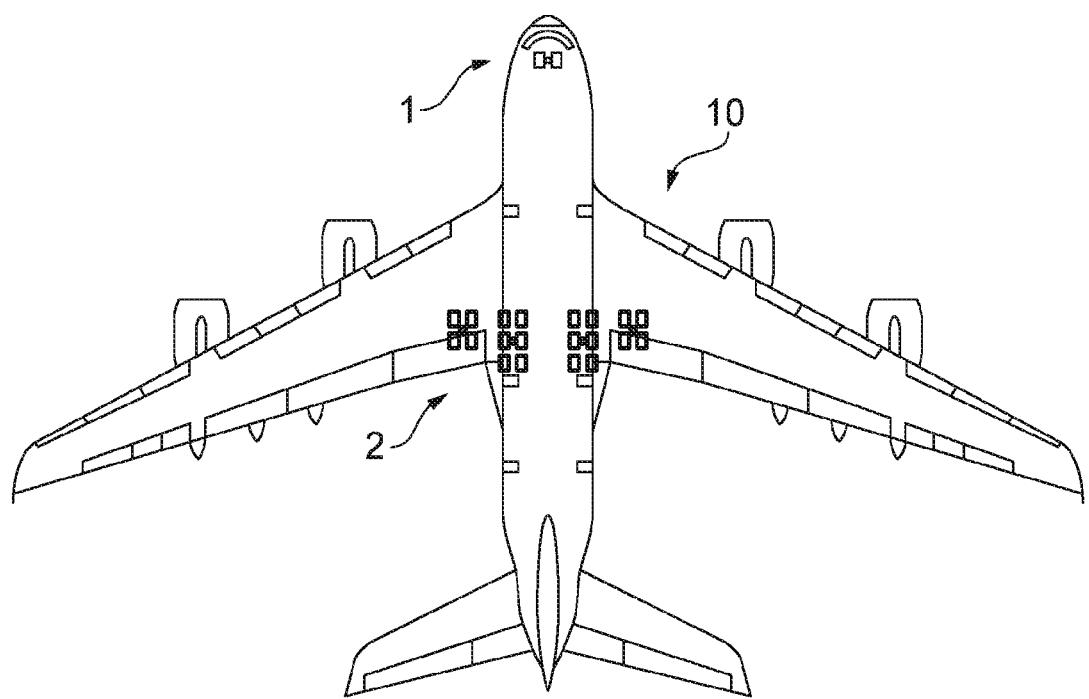
FIG. 1 is a plan view of an aircraft.
Figure 2:
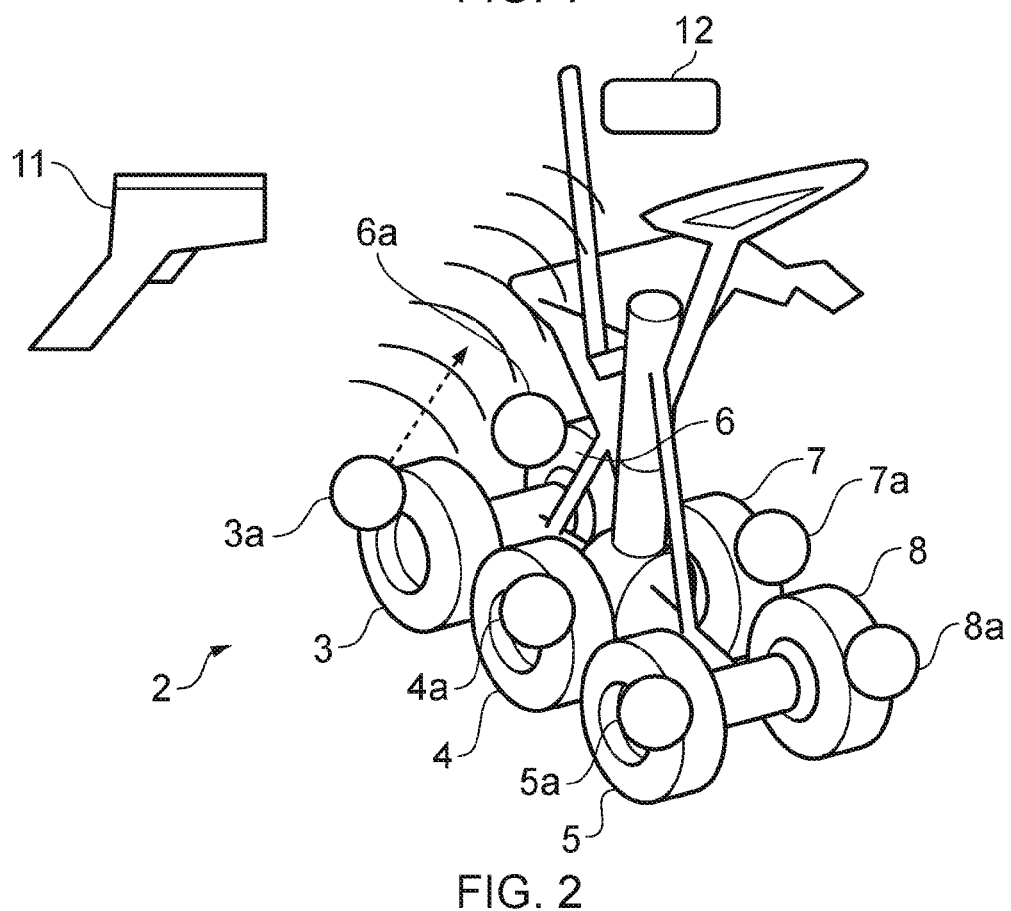
FIG. 2 shows one of the landing gears of the aircraft and a hand-held device.

FIG. 1 is a plan view of an aircraft 10 showing its landing gears: a nose landing gear (NLG) 1 and four main landing gears (MLGs) 2. FIG. 2 shows a landing gear system for one of its four MLGs, comprising six wheels with tires 3-8. Each wheel has a respective sensor system 3a-8a for taking pressure and temperature readings from a respective tire 3-8 of the wheel. All twenty two wheels of the aircraft have equivalent sensor systems.

Each sensor system 3a-8a has a wireless transmitter for wirelessly transmitting data to a hand-held device 11 and a receiver 12. The receiver 12 may either be mounted on a strut of the landing gear, or within a landing gear bay into which the landing gear retracts after take-off.

Figure 3:
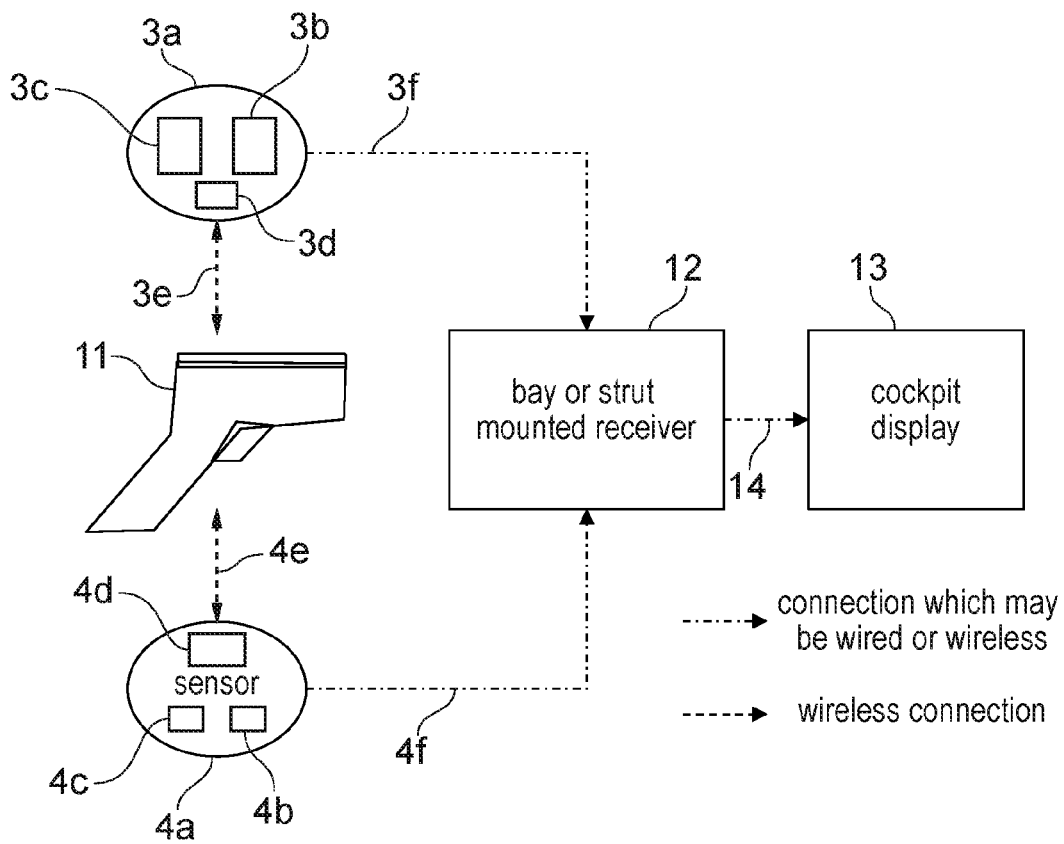
FIG. 3 shows a system for checking the pressures of the tires of the aircraft.

FIG. 3 is a schematic view of a system for checking the pressures of the tires of the aircraft 10. Only two of the sensor systems 3a, 4a are shown for purposes of clarity. Each sensor system comprises a pressure sensor 3b, 4b for measuring a pressure of the tire to generate pressure readings, a temperature sensor 3c, 4c for measuring a gas temperature of the tire to generate temperature readings, and a transmitter 3d, 4d for wirelessly transmitting the pressure and temperature readings to the hand-held device 11 or the receiver 12.

The hand-held device 11 receives the pressure and temperature readings from the transmitters 3d, 4d via wireless connections 3e, 4e, and the receiver 12 receives the same pressure and temperature readings via connections 3f, 4f which may be either wired or wireless.

Figure 4:
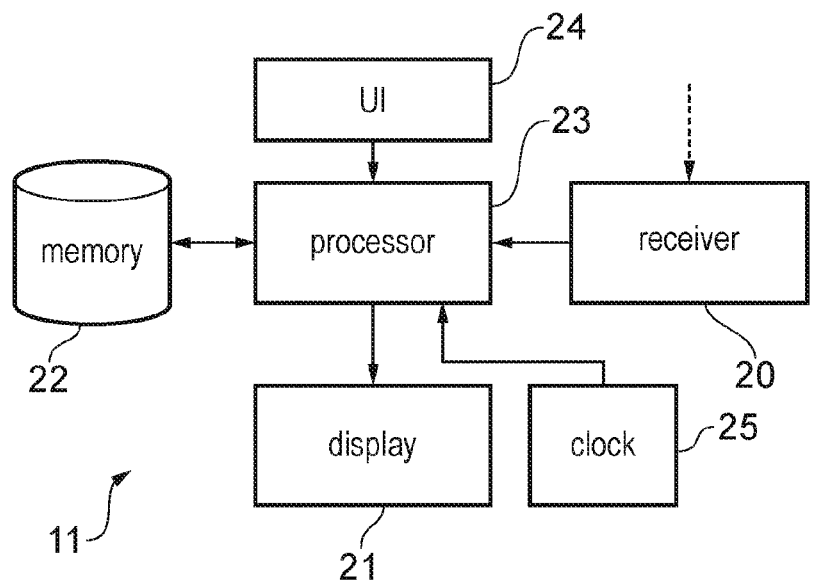
FIG. 4 shows some of the elements of the hand-held device.

FIG. 4 is a schematic view of some of the elements of the hand-held device 11. The device comprises a wireless receiver 20 for receiving the pressure and temperature readings; a display 21; a memory 22; a processor 23; a user interface (UI) 24 such as a touch screen, keyboard and/or camera; and a clock 25.

Figure 5:
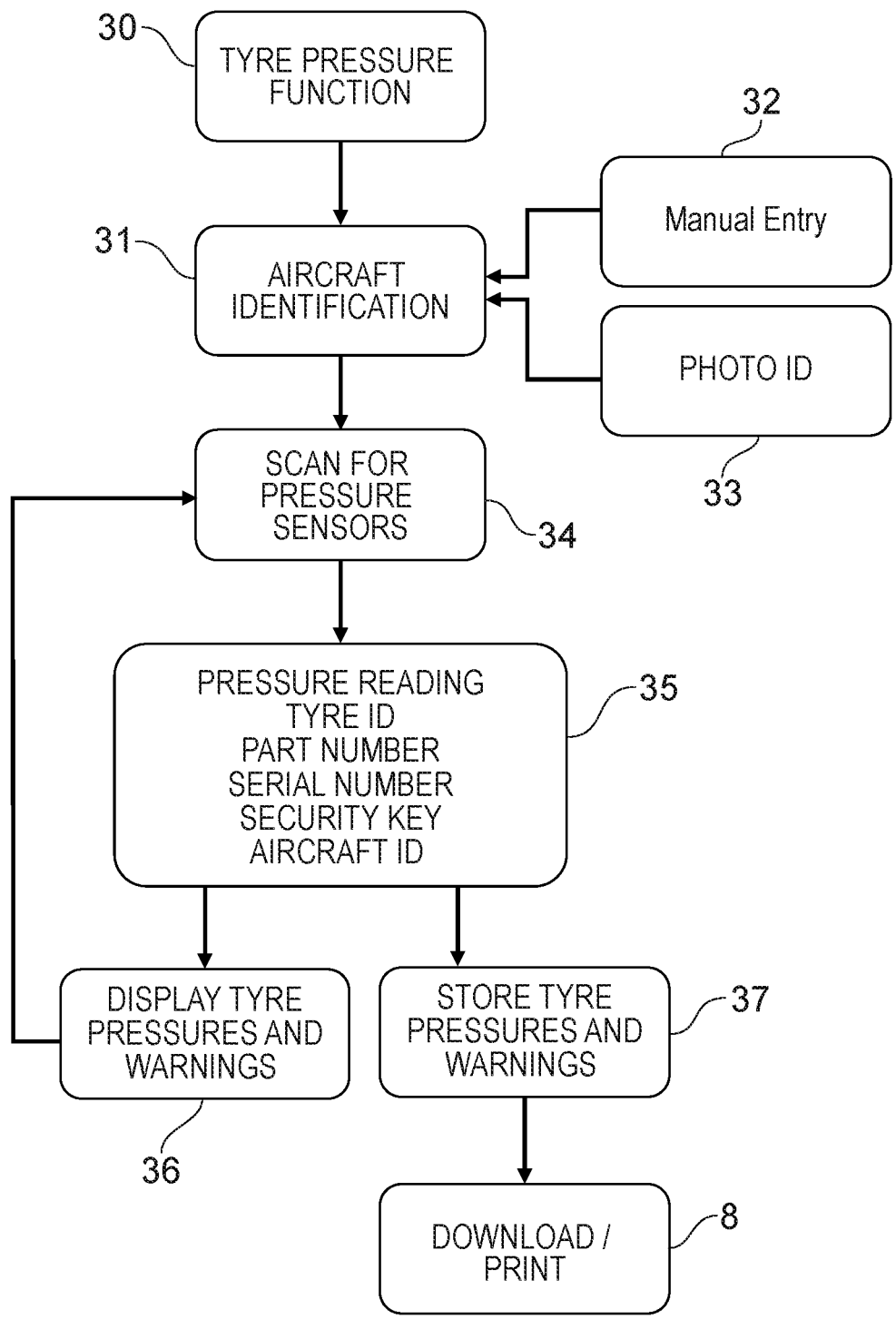
FIG. 5 is a flow diagram illustrating the process for checking tire pressures on a single aircraft.

FIG. 5 illustrates how the system of FIG. 3 is operated by a ground crew member to check the pressures of the tires of the aircraft 10. In step 30 the ground crew member inputs via the UI 24 a request to check the tire pressures. Next the processor 23 displays a prompt to the ground crew member to input an aircraft ID 31 into the device via the UI 24. The aircraft ID uniquely identifies the aircraft, and is typically the aircraft registration (a unique alphanumeric string that is displayed on the aircraft, typically on its aft fuselage or tail plane). Entry of the aircraft ID may be performed in one of two ways: either manual entry 32 by the ground crew member entering the aircraft ID via a keyboard or touch screen, or by using a camera of the UI 24 to take a digital image of the aircraft registration displayed on the aircraft, followed by the processor 23 performing automated image analysis 33 to determine the aircraft ID from the image.

Next the hand-held device 11 scans for pressure sensors at step 34. This prompts each pressure sensor to take a pressure reading and wirelessly transmit it to the device 11 at step 35 along with various metadata stored at the pressure sensor including a tire ID, sensor part number, sensor serial number, aircraft ID and security key.

Figure 6:
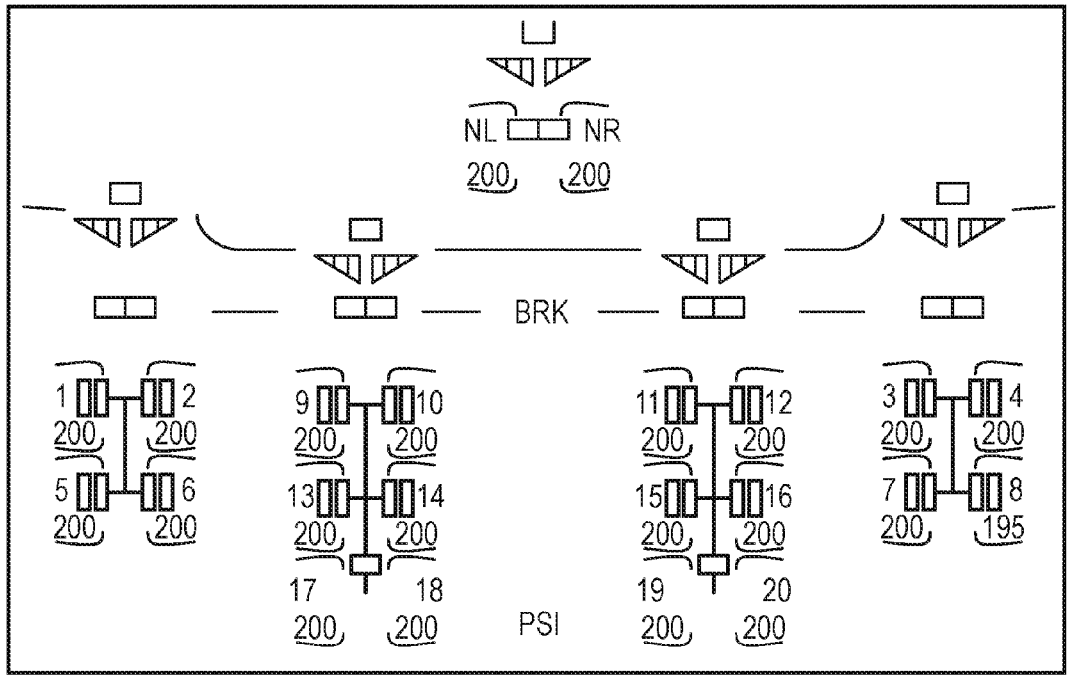
FIG. 6 is a first example of a display screen.

The tire ID indicates the tire's position on the aircraft, and FIG. 6 shows the naming convention for the twenty two tire IDs of the aircraft 10. In this example the left wheel of the NLG 1 has a tire ID of NL, the right wheel of the NLG 1 has a tire ID of NR, the forward left wheel of the MLG 2 has a tire ID of 1, and so on. Although the tire IDs are not unique (i.e. they are repeated between different aircraft) each combination of aircraft ID and tire ID is unique.

The sensor part number and sensor serial number together uniquely identify a particular pressure sensor.

The hand-held device 11 stores the pressure readings in its memory 22 at step 37, and also associates each stored pressure reading with various other items of data such as the metadata received from the pressure sensor, and a time stamp from the clock 25 based on the time of receipt of the pressure reading.

The aircraft ID is received via user input (at step 32 or 33), and each pressure sensor is also previously programmed with the aircraft ID which it transmits to the device 11 in step 35 along with the other metadata with each pressure reading. The hand held device 11 checks that the aircraft ID received from each pressure sensor in step 35 matches the aircraft ID received from the user in steps 32 or 33. If there is no match then a fault message (such as "XX") is presented on the display 21.

The pressure sensors may be previously programmed with the aircraft ID by the hand-held device 11 which is operated by a ground crew member to transmit the aircraft ID to the pressure sensors.

The memory 22 of the device 11 is pre-loaded with tire reference data which is used by the processor 23 to display useful information to the ground crew member. This tire reference data includes reference pressure levels for each tire of the aircraft, along with the parameters of a colour coding system described below. In a simple example, the reference pressure level for each of the twenty-two tires of the aircraft may be 200 psi, for example. In a more complex example, the reference pressure level may differ between the NLG 1 and the MLGs 2.

For a given aircraft type (for example the Airbus A380™ shown in this example) the reference pressure levels may vary from individual aircraft to aircraft, and may be dictated by a number of factors such as maximum take-off weight (a higher maximum take-off weight being associated with higher reference pressure levels). So for each unique combination of tire ID and aircraft ID, the memory 22 contains data which links that aircraft ID/tire ID combination with a reference pressure level. Optionally the tire reference data (including the reference pressure levels) may be stored by the pressure sensors 3b, 4b instead of being stored in the memory 22 of the device 11, or in addition to being stored in the memory 22 of the device 11. If the tire reference data is not stored in the memory 22 of the device 11, then it is obtained from the pressure sensors 3*b*, 4*b* via the wireless connections 3*e*, 4*e* along with the other data transmitted at step 35, and optionally stored in the memory 22.

For each pressure reading received at step 35, the processor 23 obtains the reference pressure level associated with the aircraft ID and tire ID of that pressure reading, and compares the pressure reading with that reference pressure level. If the pressure reading is at the reference pressure level then no warning is required. If the pressure reading is below the reference pressure level then the processor is programmed to cause the display 21 to present a warning as described below. The processor 23 obtains the reference pressure level by either receiving it from the pressure sensor in step 35, or by using the aircraft ID and the tire ID to retrieve it from the memory 22.

FIG. 6 is a first example of a display screen which can be presented to the ground crew member at step 36 of FIG. 5. Each tire is represented graphically and labelled with its tire ID. The pressure reading for each tire is also displayed next to the tire graphic. In this example tires 1-7 and 9-22 all have the reference pressure of 200 psi, whereas the tire 8 has a slightly lower pressure of 195 psi, below the reference pressure level.

A colour coding system is used to display any necessary warnings. In this example all of the 200 psi pressure readings are displayed in green, whereas the 195 psi pressure reading is displayed in amber which provides an amber warning to the crew member that the tire 8 is slightly below the reference pressure level of 200 psi.

Figure 7:
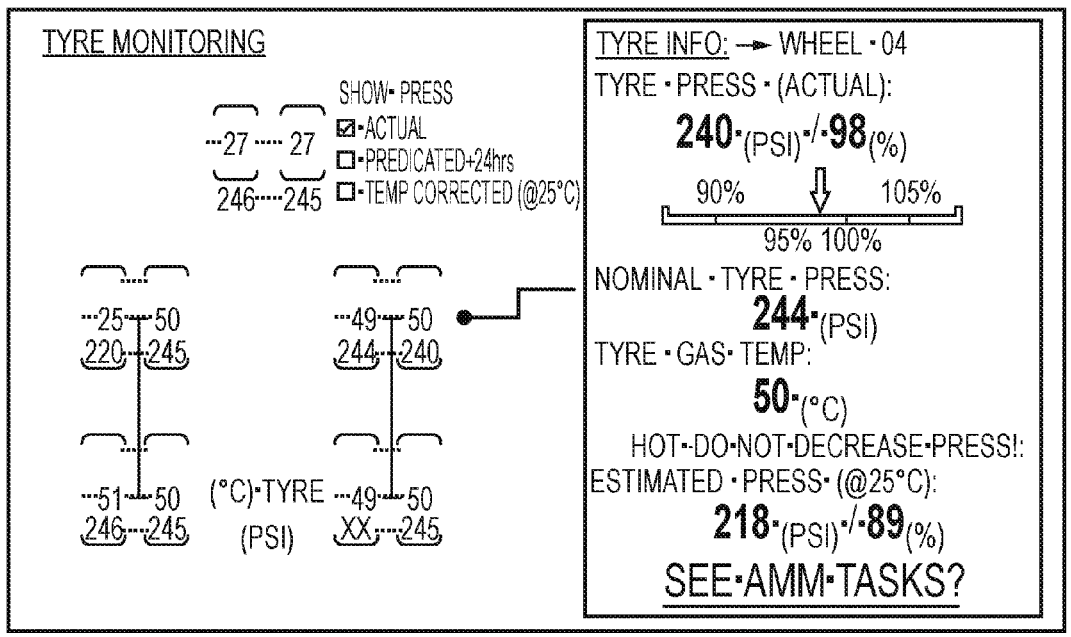
FIG. 7 is a second example of a display screen.

FIG. 7 gives a second example of a display screen which can be presented to the crew member at step 36 of FIG. 5. Note that this display screen is for a different aircraft with two rather than four MLGs. The left-hand side of the display shows pressure readings for the ten tires of the aircraft (colour coded as with FIG. 6 for any tires which are under a nominal tire pressure of 244 psi). In this example two of the tires are under the nominal tire pressure with pressures of 220 psi and 240 psi, unlike the other tires which all have a pressure of either 245 psi or 246 psi.

As described above, each sensor system has not only a pressure sensor 3*b*, 4*b* but also a temperature sensor 3*c*, 4*c* which can measure a gas temperature of the tire. When a pressure reading is taken by a pressure sensor 3*b*, 4*b*, its associated temperature sensor 3*c*, 4*c* also obtains a tire gas temperature reading indicative of a gas temperature of the tire. The sensor system wirelessly transmits the temperature reading along with the pressure reading and metadata to the hand-held device 11 and to the receiver 12. The tire gas temperature for each tire is displayed as shown in FIG. 7 along with the pressure readings. For example the NLG tires have temperatures of 27° C. and the MLG tires have temperatures ranging from 25° C. to 51° C.

The right-hand side of the display gives more detailed information for a selected tire (in this case the tire for wheel 04). The information for the tire with the lowest pressure is automatically displayed on the right-hand side of the display, unless the user selects another tire. At the top is the actual pressure reading (240 psi) along with a percentage (in this case 98%) which indicates the ratio between the actual pressure reading and the reference pressure level for that tire (the reference pressure level for this tire being 244 psi which is displayed as a "nominal tire press").

Next the display has a graphic with an arrow pointing at a scale which indicates whether the percentage is in a green zone (from 100% to 102.5%), a blue zone (above 102.5%), an amber warning zone (from 90% to 100%) or a red warning zone (below 90%). In this example the percentage (98%) is in the amber zone so the actual pressure reading (240 psi) and the percentage (98%) are displayed in amber.

An ambient temperature value indicative of an ambient temperature at the aircraft is also obtained by the hand-held device 11. The ambient temperature value may be obtained from a temperature sensor at the hand-held device 11 or on the aircraft, or from a local weather report which wirelessly transmits the ambient temperature value to the device 11.

The right-hand side of the display also includes a tire gas temperature reading (in this case 50° C.) for the selected tire and an estimated tire pressure and percentage at ambient temperature (in this case 218 psi and 89% at an ambient temperature of 25° C.). Since the estimated tire pressure percentage at 25° C. is in the red zone, these numbers are both displayed in red.

The estimated tire pressure at 25° C. is an adjusted pressure calculated by the processor 23 on the basis of the actual tire pressure reading (240 psi), the tire gas temperature reading (50° C.) and the ambient temperature value (25° C.). The processor uses an algorithm to predict the level that the pressure will change to when the gas reaches ambient temperature—in this case it predicts an adjusted pressure of 218 psi. For example the algorithm may assume that for every 10° C. reduction in temperature the pressure will reduce by 3.7%.

In the example of FIG. 7, both the actual pressure reading (240 psi) and the estimated tire pressure at 25° C. (218 psi) are displayed. In an alternative embodiment, only one of these values may be displayed.

For one of the tires in FIG. 7, either no pressure data is available, the security key is incorrect, or the aircraft ID from each pressure sensor does not match the aircraft ID received from the user in steps 32 or 33. In this case a fault message "XX" is displayed.

If a tire pressure is not available then optionally the display can also indicate that a manual check of the associated wheel (for example wheel 7) is required. The ground crew member can then take a manual pressure reading (with a hand-held pressure gauge) and manually enter it into the device 11 via the user interface 24.

Once the ground crew member has walked round the aircraft and taken pressure readings from all of the tires, he can then walk to another aircraft and repeat the process by requesting another pressure check at step 30, this time using a different aircraft ID. The process can then be repeated further to take pressure readings from a fleet of aircraft, some of which may have different reference pressure levels.

As well as displaying the pressure readings and associated information as described above, the device 11 can also connect to another device (such as a personal computer or printer) at step 38 to download or print the pressure readings and associated information. This enables an aircraft operator to keep a permanent record of tire pressure data for a fleet of aircraft.

An advantage of the process of FIG. 5 is that it can be performed by the ground crew member on the ground outside the aircraft, without requiring the crew member to enter the cockpit. This makes the process quick, enabling a single ground crew member to take pressure readings and associated information from a large fleet of aircraft in a small amount of time.

The system shown in FIG. 3 also includes a cockpit system 13 in the cockpit of the aircraft which can receive the various pressure and temperature readings and associated information via the receiver 12 and a connection 14 which may be wired or wireless. This enables the cockpit system 13 to generate and display the same information as the hand-held device 11. This feature of the system is optional: in other words the receiver 12 and cockpit display 13 may be omitted.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method of checking the pressure of a tire of an aircraft, the method comprising:
    taking a pressure reading from the tire with a pressure sensor;
    transmitting the pressure reading from the pressure sensor to a hand-held device via a wireless connection; and
    at the hand-held device: receiving the pressure reading from the pressure sensor via the wireless connection; obtaining an aircraft ID which uniquely identifies the aircraft; obtaining a tire ID; obtaining a reference pressure level associated with the aircraft ID and the tire ID; comparing either the pressure reading, or an adjusted pressure based on the pressure reading, with the reference pressure level; and displaying a warning if the pressure reading, or the adjusted pressure based on the pressure reading, is below the reference pressure level,
    wherein the aircraft ID is obtained at the hand-held device by receiving the aircraft ID from the pressure sensor via the wireless connection,
    wherein an another aircraft ID is obtained at the hand-held device from a user interface; and
    the method further comprises checking that that aircraft ID received from the pressure sensor via the wireless connection matches the another aircraft ID received from the user interface.

2. The method of claim 1 further comprising:
    calculating the adjusted pressure based on the pressure reading;
    comparing the adjusted pressure with the reference pressure level; and
    displaying the warning if the adjusted pressure is below the reference pressure level.

3. The method of claim 2 further comprising obtaining at the hand-held device a tire gas temperature reading indicative of a gas temperature of the tire, and an ambient temperature value indicative of an ambient temperature; and wherein the adjusted pressure is calculated based on the tire gas temperature reading and the ambient temperature value, the adjusted pressure estimating the pressure of the tire when the gas temperature of the tire reduces to the ambient temperature.

4. The method of claim 1 comprising at least one of (a) and (b), wherein (a) and (b) are:
    (a) comparing the pressure reading with the reference pressure level; and
    displaying the warning or another warning if the pressure reading is below the reference pressure level; and
    (b) calculating the adjusted pressure based on the pressure reading; comparing the adjusted pressure with the reference pressure level; and displaying the warning or another warning if the adjusted pressure is below the reference pressure level.

5. The method of claim 1 wherein the aircraft ID is obtained at the hand-held device by receiving the aircraft ID from the pressure sensor via the wireless connection.

6. The method of claim 1, wherein the reference pressure level is a first reference pressure level, and the method further comprises:
    taking a second pressure reading from a second tire of the aircraft with a second pressure sensor;
    wirelessly transmitting the second pressure reading to the hand-held device; and
    at the hand-held device: receiving the second pressure reading; receiving a second tire ID; obtaining a second reference pressure level associated with the aircraft ID and the second tire ID, wherein the second reference pressure level is different to the first reference pressure level; comparing either the second pressure reading, or a second adjusted pressure based on the second pressure reading, with the second reference pressure level; and displaying a warning if the second pressure reading, or the second adjusted pressure based on the second pressure reading, is below the second reference pressure level.

7. The method of claim 6 further comprising simultaneously displaying the first and second pressure readings at the hand-held device.

8. The method of claim 1 further comprising:
    taking a second pressure reading from a second tire of the aircraft with a second pressure sensor;
    wirelessly transmitting the second pressure reading to the hand-held device; and
    at the hand-held device: receiving the second pressure reading; and simultaneously displaying the first and second pressure readings.

9. The method of claim 1 wherein the reference pressure level is obtained at the hand-held device by receiving it from the pressure sensor via the wireless connection.

10. The method of claim 1 wherein the reference pressure level is stored in a memory of the hand-held device and linked in the memory with the aircraft ID and the tire ID; and the reference pressure level is obtained at the hand-held device by using the aircraft ID and the tire ID to retrieve the reference pressure level from the memory.

11. A method of checking the pressures of tires of a plurality of aircraft, the method comprising for each aircraft:
    performing the method of claim 1 with the hand-held device, each aircraft having a different aircraft ID; and
    at the hand-held device: storing each pressure reading in a memory, and linking each pressure reading stored in the memory with its aircraft ID and tire ID.

12. A hand-held device for checking the pressure of a tire of an aircraft, the device comprising:
    a receiver for receiving a pressure reading and an aircraft ID which uniquely identifies the aircraft, wherein both the pressure reading and the aircraft ID are received from a tire pressure sensor via a wireless connection;

the receiver is also for receiving another aircraft ID from a user interface;

a display; and a processor programmed to: check that the aircraft ID from the tire pressure sensor matches the another aircraft ID from the user interface; compare the pressure reading, or an adjusted pressure based on the pressure reading, with a reference pressure level, cause the display to present a warning if the pressure reading, or the adjusted pressure based on the pressure reading, is below the reference pressure level, wherein the reference pressure level is associated with the aircraft ID and a tire ID.

13. The device of claim 12 wherein the processor is programmed to calculate the adjusted pressure based on the pressure reading; compare the adjusted pressure with the reference pressure level; and cause the display to present the warning if the adjusted pressure is below the reference pressure level.

14. The device of claim 12 further comprising a memory storing the reference pressure level and linking the reference pressure level with the aircraft ID and the tire ID, wherein the processor is programmed to use the aircraft ID and the tire ID to retrieve the reference pressure level from the memory.

15. The device of claim 12 wherein the processor is programmed to obtain the aircraft ID and/or the tire ID from the receiver.

16. An aircraft landing gear system comprising:

a tire;

a hand-held device according to claim 12; and a pressure sensor arranged to take the pressure reading from the tire and transmit the pressure reading to the hand-held device via the wireless connection.

17. The system of claim 16 wherein the pressure sensor stores the aircraft ID and is arranged to transmit the aircraft ID to the hand-held device via the wireless connection.

18. The system of claim 12, wherein the pressure sensor stores the reference pressure level and is arranged to transmit the reference pressure level to the hand-held device via the wireless connection.

19. A method of checking the pressure of a tire of an aircraft, the method comprising:

measuring a pressure in the tire with a pressure sensor and transmitting wirelessly the measured pressure to a hand-held device;

receiving the measured pressure by a hand-held computing device via the wireless transmission;

receiving by the hand-held computer device and from the pressure sensor an aircraft identifier which uniquely identifies the aircraft attached to the tire;

receiving by the hand-held computer device and via a user interface another aircraft identifier;

checking, by the hand-held computer device, that the aircraft identifier received from the pressure sensor and the another aircraft identifier received via the user interface match;

receiving by the hand-held computer device a tire identifier which uniquely identifies the tire associated with the measured pressure;

the hand-held computer device determines or obtains a reference pressure corresponding to the aircraft associated with the aircraft identifier and corresponding to the tire associated with the tire identifier;

determine whether the reference pressure and the measured pressure indicate a low pressure condition in the tire, wherein the determination is performed automatically by the hand-held computer device, and display automatically an alert on the hand-held computer device if the determination is that the low pressure condition exists in the tire.

20. The method of claim 19 wherein the determination includes:

measuring a gas temperature in the tire and determining a gas temperature difference between the measured gas temperature and an ambient temperature of the atmosphere surrounding the aircraft;

calculating an adjusted pressure based on the measured pressure and the gas temperature difference, wherein the adjusted pressure reflects a pressure in the tire if the gas temperature were at the ambient temperature, and comparing the adjusted pressure to the reference pressure to determine whether the low pressure condition exists in the tire.

* * * * *

UNITED STATES PATENT AND TRADEMARK OFFICE
CERTIFICATE OF CORRECTION

Page 1 of 1

PATENT NO. : 9,895,943 B2
APPLICATION NO. : 15/075411
DATED : February 20, 2018
INVENTOR(S) : Andrew Bill It is certified that error appears in the above-identified patent and that said Letters Patent is hereby corrected as shown below:

In the Claims

Claim 1, Column 7, Line 51, change "that that" to --that the--.

Signed and Sealed this
First Day of December, 2020

Andrei Iancu
*Director of the United States Patent and Trademark Office*